US012776597B2

(12) United States Patent
Farinola et al.

(10) Patent No.: US 12,776,597 B2
(45) Date of Patent: Oct. 27, 2026

(54) CONNECTOR ASSEMBLY FOR BATTERY MODULES OF AN ELECTRIC VEHICLE

(71) Applicant: TE Connectivity Italia Distribution S.r.l., Turin (IT)

(72) Inventors: Marcello Farinola, Collegno (IT); Alessandro Genta, Collegno (IT)

(73) Assignee: TE Connectivity Italia Distribution S.r.l., Turin (IT)

( * ) Notice: Subject to any disclaimer, the term of this patent is extended or adjusted under 35 U.S.C. 154(b) by 341 days.

(21) Appl. No.: 18/604,393

(22) Filed: Mar. 13, 2024

(65) Prior Publication Data

US 2024/0313435 A1 Sep. 19, 2024

(30) Foreign Application Priority Data

Mar. 14, 2023 (IT) ........................ 102023000004809

(51) Int. Cl.
*H01R 4/30* (2006.01)
*H01R 43/26* (2006.01)
*B60L 50/60* (2019.01)

(52) U.S. Cl.
CPC ............. *H01R 4/302* (2013.01); *H01R 43/26* (2013.01); *B60L 50/60* (2019.02)

(58) Field of Classification Search
CPC ................................ H01R 4/302; H01R 43/26
(Continued)

(56) References Cited

U.S. PATENT DOCUMENTS 5,108,320 A * 4/1992 Kimber .................. H01R 11/12 D13/133
7,766,703 B2 * 8/2010 Carver .................. H01R 11/26 439/801

FOREIGN PATENT DOCUMENTS

CN 206650178 U 11/2017
CN 208539122 U 2/2019
(Continued)

OTHER PUBLICATIONS

Extended European Search Report for corresponding EP Application No. 24162824.7-1201 dated Jul. 12, 2024 (11 pages).
(Continued)

*Primary Examiner* — Phuong K Dinh

(74) *Attorney, Agent, or Firm* — Jay J. Hoette; Carroll, Hoette & Butscher, LLC

(57) ABSTRACT

A connector assembly for battery modules of an electric vehicle includes a connector element and a counterpart arranged to be mutually connected in an electrically conductive manner. The connector element includes a protective casing having an outer collar configured for coupling with the counterpart. The connector assembly includes an electrical connection unit having opposite ends adapted for electrically connecting two connector assemblies positioned on respective battery modules. The connector assembly includes a fastening unit comprising a connection screw axially positioned within the outer collar and engaged with the counterpart, an integrated sealing system to prevent water infiltration into the connector element or the counterpart, and a locking ring to lock in position the screw inserted inside the outer collar even when not fixed to the counterpart. The locking ring comprises at least one locking flange cooperating with a locking shoulder formed along the inner surface of the outer collar.

19 Claims, 9 Drawing Sheets

(58) Field of Classification Search
USPC .......................................................... 439/801
See application file for complete search history.

(56) References Cited

FOREIGN PATENT DOCUMENTS

| | | | |
|---|---|---|---|
| DE | 102021117336 | B3 | 11/2022 |
| EP | 0592102 | B1 | 7/1998 |
| EP | 3869619 | A1 | 8/2021 |
| EP | 3940887 | A1 | 1/2022 |
| EP | 3940907 | A1 | 1/2022 |
| EP | 4075607 | A1 | 10/2022 |
| EP | 4120479 | A1 | 1/2023 |
| EP | 4123838 | A1 | 1/2023 |
| KR | 20040063045 | A | 7/2004 |

OTHER PUBLICATIONS

Search Report for corresponding IT Application No. 202300004809 dated Mar. 14, 2023 (8 pages).
Office Action in corresponding IN Application No. 202444016764, dated May 21, 2026, (7 pages).

* cited by examiner

CONNECTOR ASSEMBLY FOR BATTERY MODULES OF AN ELECTRIC VEHICLE

CROSS REFERENCE TO RELATED APPLICATIONS

This application claims the benefit of IT application No. 102023000004809, filed 14 Mar. 2023, the subject matter of which is herein incorporated by reference in its entirety.

BACKGROUND OF THE INVENTION

The subject matter relates to a connector assembly for battery modules of an electric vehicle.

Connectors for battery modules are typically made to electrically connect several battery modules that form a battery pack mounted on an electrically driven vehicle.

Document DE 10 2021 117 336 describes a connector assembly for such an application, comprising two connector parts connected together by a connection screw.

In general, in the field of electrical connectors for battery modules, the need to simplify and make reliable electrical connections between the various components has now become a primary concern for manufacturers.

A need remains for a connector assembly that is simple and functioning, while ensuring reliability in use.

BRIEF SUMMARY OF THE INVENTION

In one embodiment, a connector assembly is provided that is extremely simple and functioning, while ensuring total reliability in use.

In another embodiment, a method is provided for assembling a connector assembly, which makes assembly operations extremely intuitive.

In an embodiment, a connector assembly is provided for battery modules of an electric vehicle, including a connector element and a counterpart arranged to be mutually connected in an electrically conductive manner, along a connection direction; the connector element including a protective casing having an outer collar electrically insulated and configured for coupling with a receiving portion of the counterpart; an electrical connection unit having opposite ends adapted for electrically connecting two connector assemblies positioned on respective battery modules, wherein for each end, the electrical connection unit includes a connecting end connected to the connector element; wherein the protective casing is made with a single body including said outer collar and a receiving portion for engagement with one end of the electrical connection unit; a fastening unit including a connection screw axially positioned within the outer collar and engaged with the counterpart; wherein the connection screw is further engaged with said connection end, so as to electrically connect the connector element, the counterpart and the electrical connection unit that, in turn, is connected to another connector assembly; an integrated sealing system to prevent water infiltration into the connector element or the counterpart; a locking ring to lock in place the screw inserted inside the outer collar, even when not fixed to the counterpart, wherein said locking ring includes at least one locking flange cooperating with a locking shoulder formed along the inner surface of the outer collar.

In one or more embodiments, the sealing system includes a first sealing element configured as an annular gasket positioned within a receiving seat formed along a lower portion of the outer collar engaged with a cup portion of the counterpart.

In one or more embodiments, the sealing system includes a second sealing element configured as an annular gasket radially superimposed over an end portion of the electrical connection unit, said second sealing element being positioned within the receiving portion of the protective casing, in the final assembled configuration.

In one or more embodiments, the sealing system includes a third sealing element configured as an annular gasket fixed within a coupling portion of a cover engaged with an upper edge of the outer collar.

In one or more embodiments, the locking ring includes a pair of locking flanges cooperating with a pair of locking shoulders, respectively, wherein, during assembly; the locking ring is axially inserted onto the top cap of the screw, with the flanges oriented in an offset position with respect to the shoulders, to enable axial insertion of the ring along the collar, up to the base portion of the cap; the locking ring is rotated about the axis of the screw, so that the shoulders are vertically superimposed over the flanges.

In one or more embodiments, each flange includes a respective flexible locking tab carrying a contact tooth suitable for being reciprocally engaged against a lateral edge of a locking shoulder.

The subject matter herein is also directed to a method for assembly as set forth in the appended claims.

BRIEF DESCRIPTION OF THE DRAWINGS

Additional features and advantages of the present invention will result from the following description with reference to the attached drawings provided as a non-limiting example only, in which.

DETAILED DESCRIPTION OF THE INVENTION

The following description illustrates various specific details aimed at a thorough understanding of the examples of the one or more embodiments. The embodiments may be implemented without one or more of the specific details, or with other methods, components, materials, etc. In other cases, known structures, materials or operations are not shown or described in detail to avoid obscuring various aspects of the embodiments. Reference to "an embodiment" within this description is to indicate that a particular configuration, structure, or feature described in connection with the embodiment is included in at least one embodiment. Therefore, expressions such as "in an embodiment", possibly found in different places in this description, do not necessarily refer to the same embodiment. In addition, particular configurations, structures, or features may be combined appropriately in one or more embodiments and/or associated with embodiments in ways other than as illustrated here, so that, for example, a feature exemplified here in relation to one figure may be applied to one or more embodiments exemplified in a different figure.

The references shown here are for convenience only and thus do not limit the scope of protection or the extent of the embodiments.

It is also to be noted that only those elements useful for understanding the invention are described in the following description, assuming, for example, that the connector assembly may include additional basic elements known per se that are necessary for its operation.

In the attached drawings, reference 1 indicates a preferred embodiment of a connector assembly, as a whole, according to an exemplary embodiment, made to electrically connect several battery modules M that form a battery pack mounted on an electrically driven vehicle.

Figure 1:
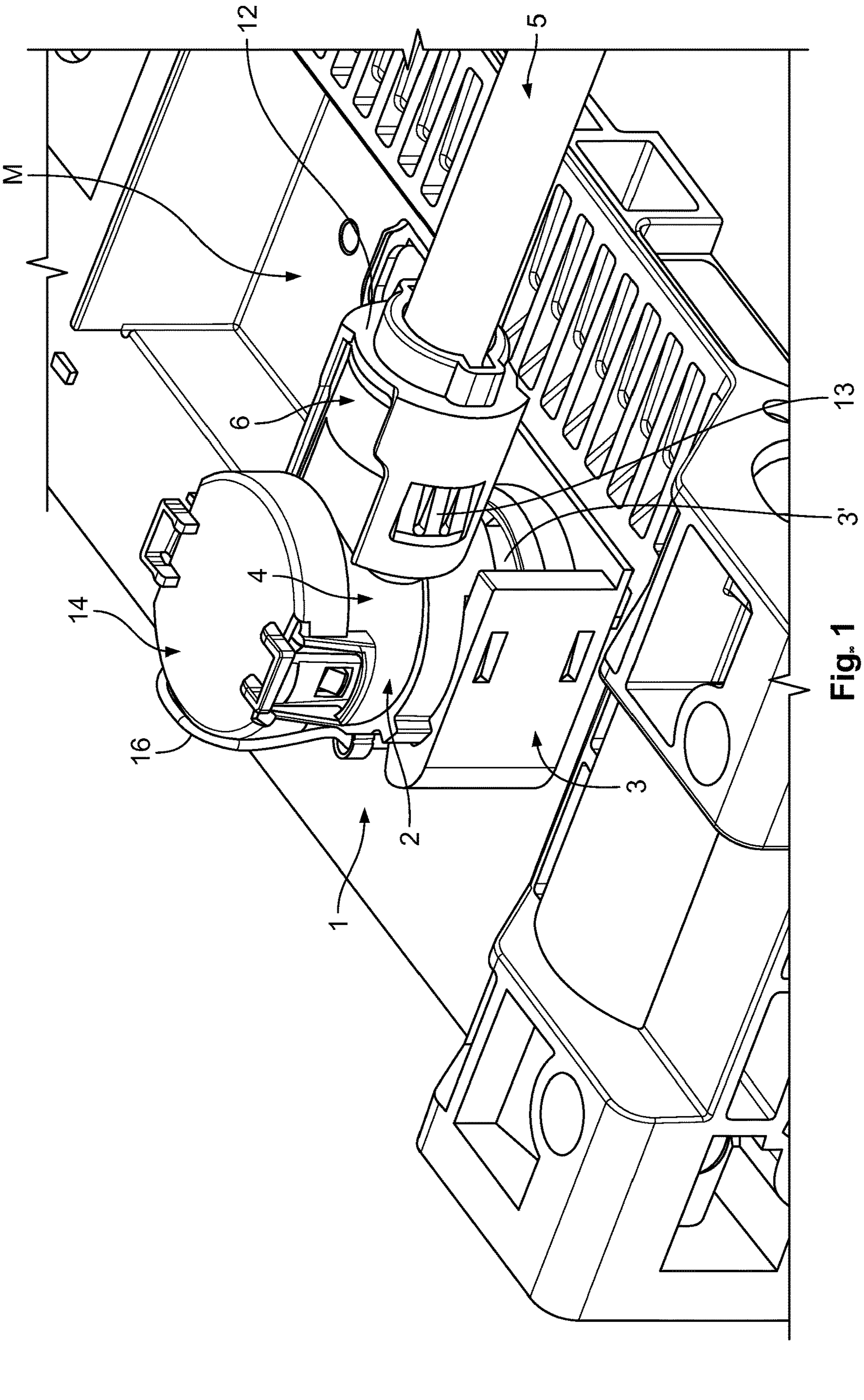
FIG. 1 is a perspective view illustrating a preferred embodiment of a connector assembly according to an exemplary embodiment, in the connected configuration.

FIG. 1 shows a preferred embodiment of the connector assembly 1 in a connected state. The connector assembly 1 comprises a connector element 2 configured to be coupled with a counterpart 3 already mounted on a respective battery module M, thus achieving, at the same time, mechanical and electrical coupling, along a connection direction.

Figure 2:
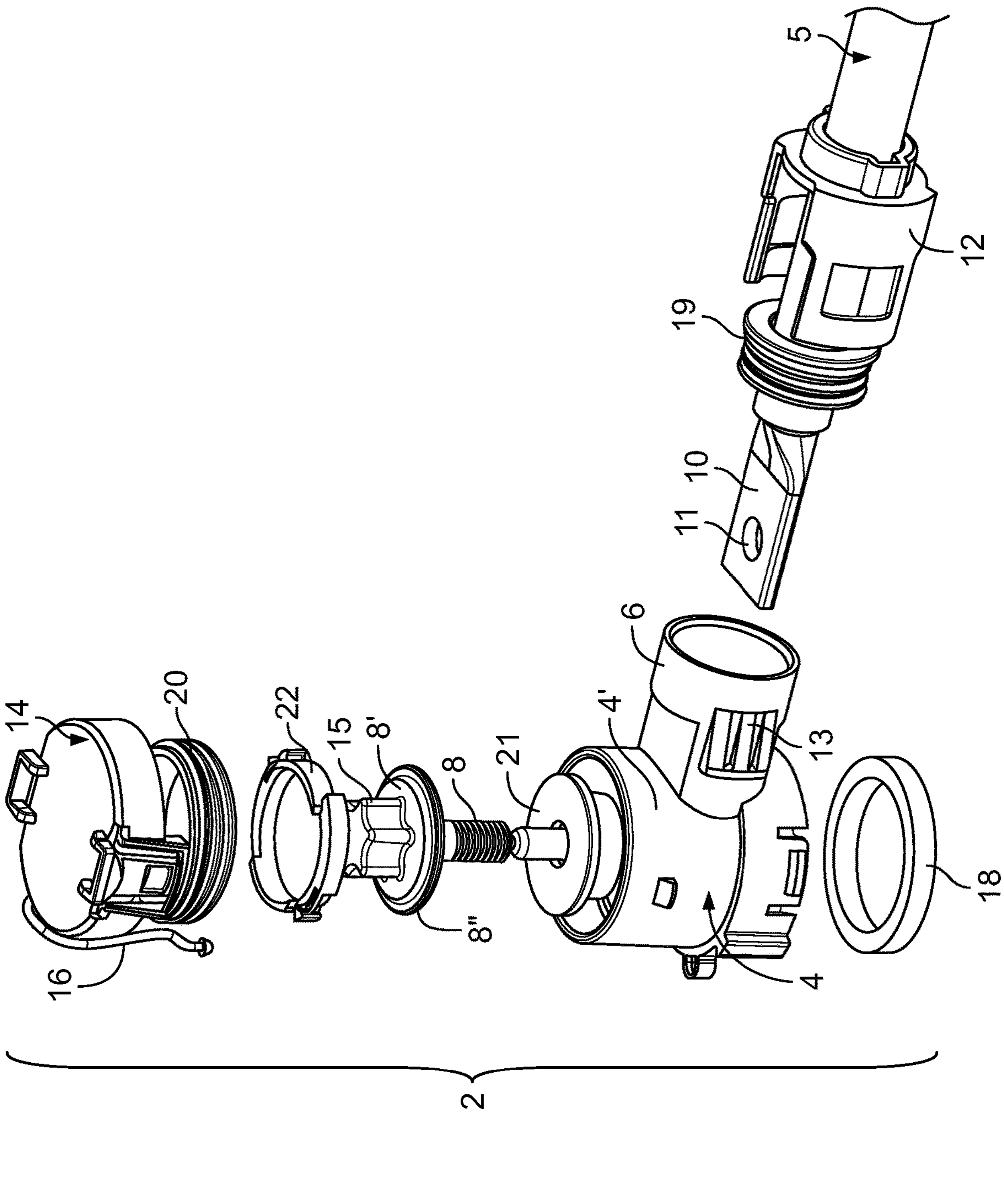
FIG. 2 is an exploded perspective view of a connector element shown in the previous figure.

FIG. 2 is an exploded perspective view illustrating the components that form the connector element 2.

The connector element 2 comprises a protective casing 4 having an outer collar 4' electrically insulated and configured for coupling with the counterpart 3. The counterpart 3 comprises an electrically insulated tactile protection, which defines a receiving portion suitable for receiving a lower portion of the outer collar 4, along the connection direction.

Figure 8:
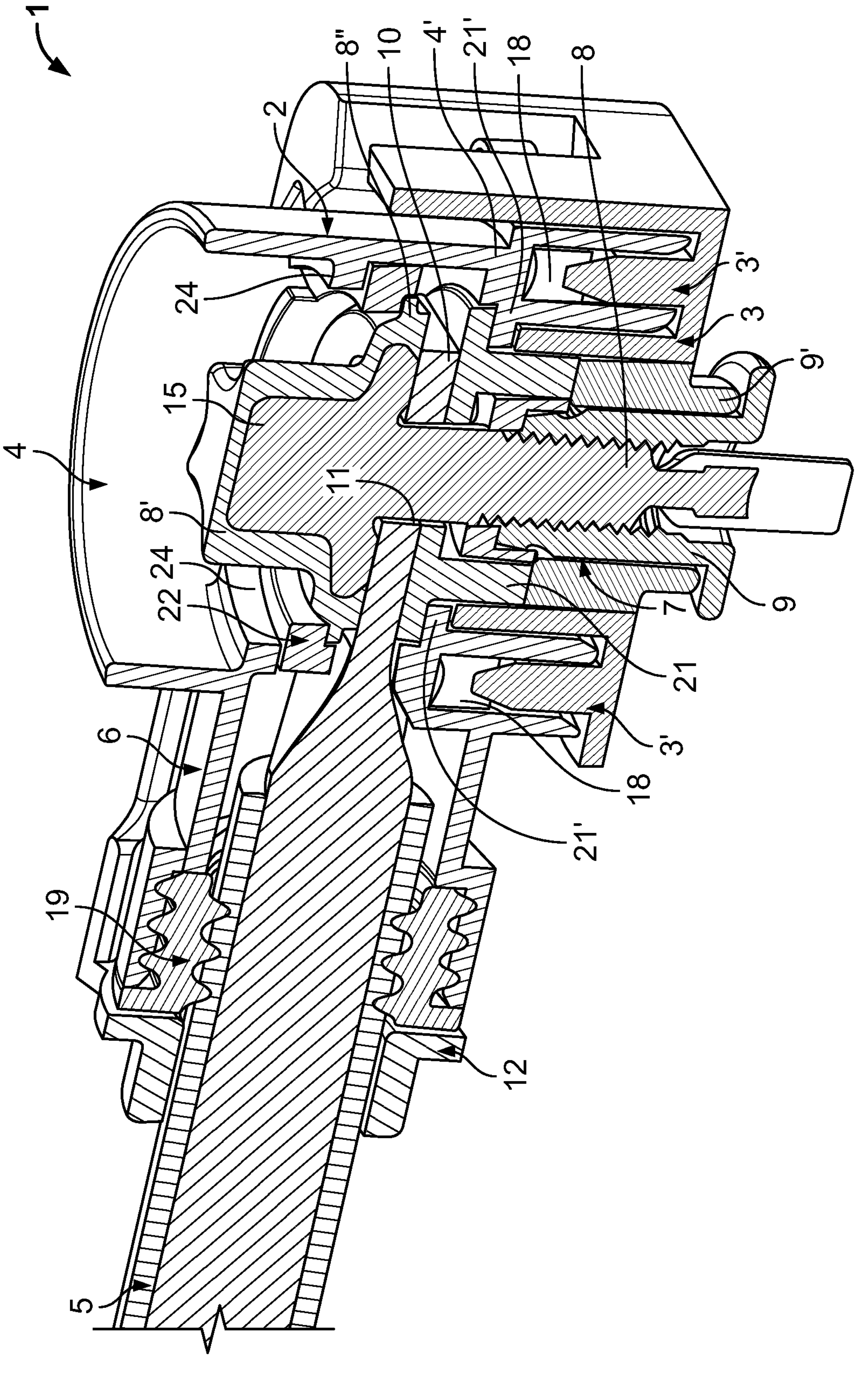
FIG. 8 is a cross-sectional view of the connector assembly, according to the plane VIII-VIII shown in FIG. 1.

Reference 5 denotes an electrical connection unit, partially illustrated in FIGS. 1, 2, 8, suitable for electrically connecting two connector assemblies 1 positioned on respective modules M of the battery assembly of the vehicle. The electrical connection unit 5 may be configured as a bundle of connection cables included axially along a tubular casing having opposite ends configured for connection to the respective connector assembly 1 in the assembled configuration.

In one or more embodiments, the protective casing 4 of the connector element 2 is made as a single body comprising said outer collar 4', and a receiving portion 6 for engaging with an end portion of the electrical connection unit 5. With reference to the illustrated embodiment, the receiving portion 6 forms an additional outer collar oriented perpendicularly with respect to the outer collar 4' for coupling with the counterpart 3. In fact, with reference to the configuration illustrated in FIG. 1, the outer collar 4' is coupled with the counterpart 3 along a vertical direction, and the end of the electrical connection unit 5 is engaged with the receiving portion 6 along a horizontal direction. Thus, it will be appreciated that, in the configuration illustrated in FIG. 1, the tubular casing of the electrical connection unit 5 extends along said horizontal direction, perpendicular to the connection direction between the connector element 2 and the counterpart 3.

The connector assembly 1 comprises a fastening unit 7 configured to fasten the connector element 2 to the counterpart 3. With reference to FIGS. 2, 8, the fastening unit 7 comprises a connection screw 8 axially positioned within the outer collar 4', and coupled with a nut element 9 arranged within the collar of the counterpart 3, so as to establish the connection between the connector element 2 and the counterpart 3. According to a further feature, in the final connected configuration, the connection screw 8 is also coupled with a connection end 10 of the electrical connection unit 5, through a fastening hole 11 cut on the connection end 10, so as to establish the electrical connection between the connector element 2, the counterpart 3, and the electrical connection unit 5 that is, in turn, connected to another connector assembly 1. In the final assembled configuration, it will then be appreciated that the end portion of the connection unit 5 is spaced within the receiving portion 6 of the casing 4, so that the fastening hole 11 is axially coupled with the screw 8 connecting the connector element 2 with the counterpart 3. The screw 8 also engages a contact ring 21 positioned within the collar 4' and having opposite faces respectively in contact with the connection end 10 of the connection unit 5 and a corresponding surface 21' formed within the collar 4'.

Preferably, the electrical connection unit 5 comprises a coupling flange 12 suitable for engaging with respective ribs 13 cut along the outer surface of the receiving portion 6 (FIGS. 1,2,8).

To establish the electrical connection, the fastening unit 7 is made of an electrically conductive material, and the nut element 9 is also mounted in contact with a portion of the electric contact portion 9' centrally located within the tactile protection of the counterpart 3.

According to a further feature, the connector assembly 1 comprises an electrically insulated top cover 14 arranged to close the connector element 2 above the head 15 of the connecting screw 8, i.e., in a position opposite to the counterpart 3. When observing the assembled configuration of FIG. 1, it is thus to be noted that the connection direction extends along a substantially vertical axis, in which a lower portion of the connector element 2 is coupled with the counterpart 3 attached to an upper surface of the battery module M. The cover 14 is then engaged with an open upper end of the protective casing 4 of the connector element 2.

According to an additional preferred feature, the cover 14 comprises an elastic retaining element 16, such as a retaining rope, having opposite ends respectively connected to the cover wall of the cover 14 and to the protective casing 4 of the connector element 2.

Figure 3:
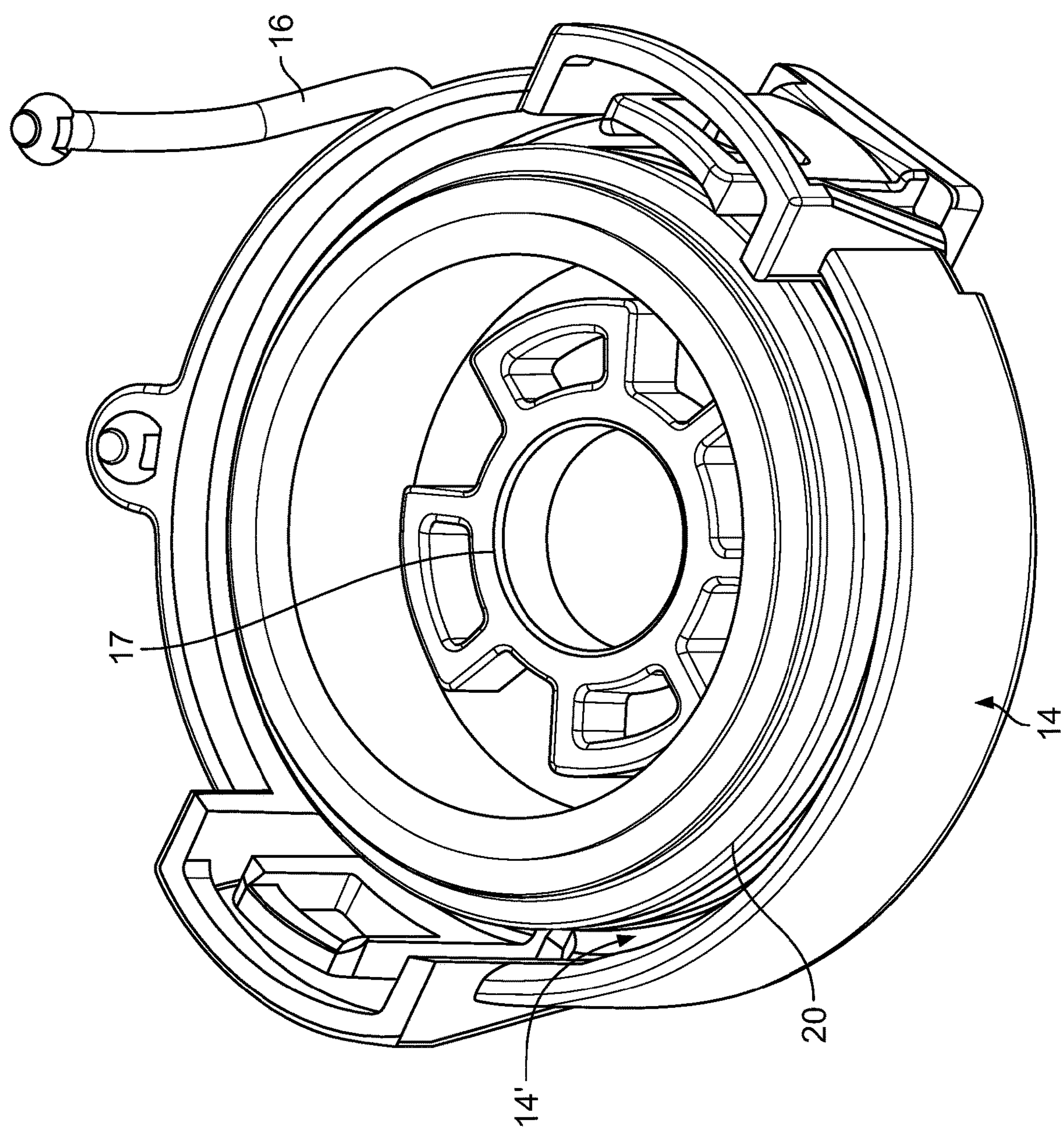
FIG. 3 is a perspective view of a top cover that is part of the connector element shown in the previous figure.
Figure 4:
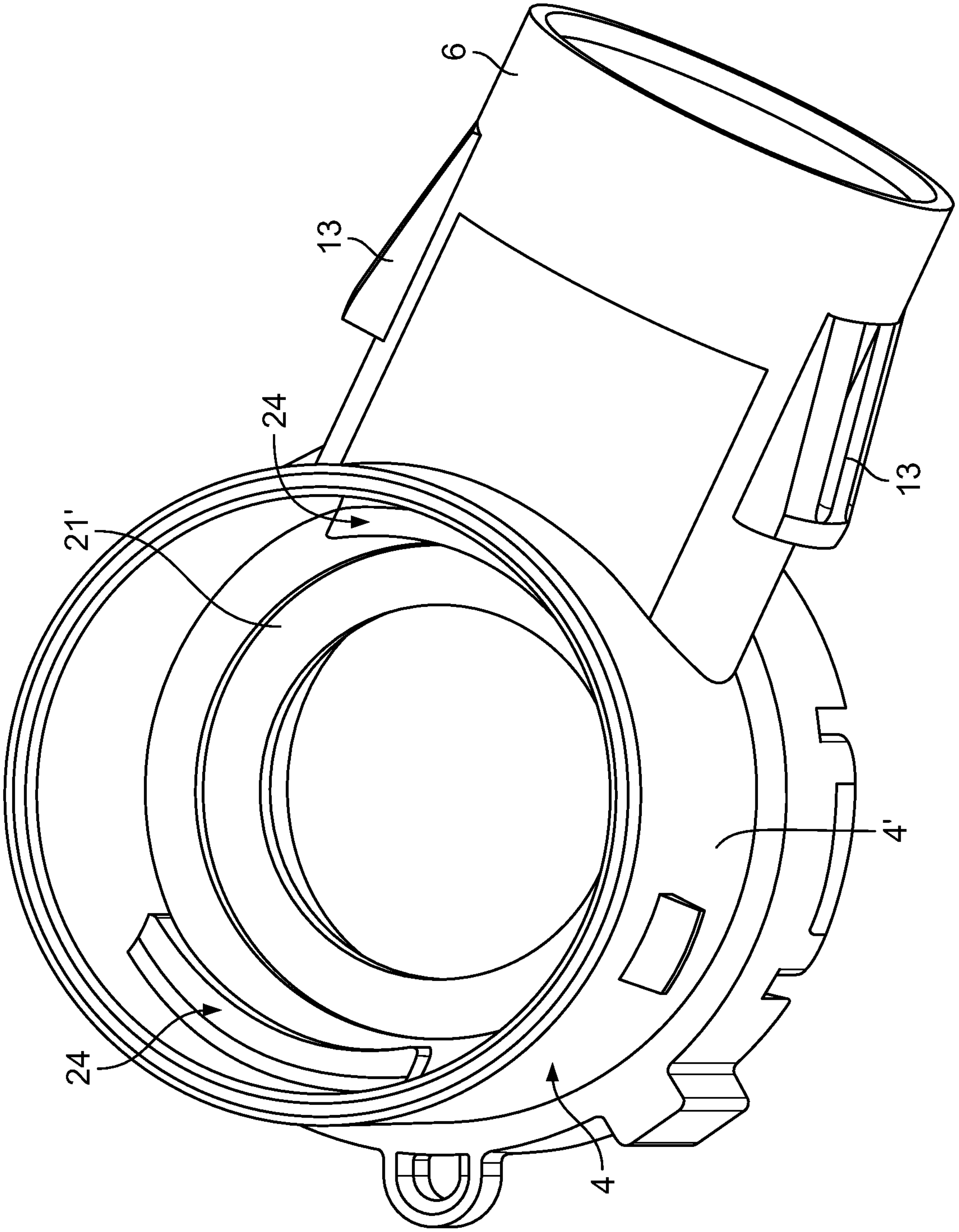
FIGS. 4, 5 are further perspective views of a protective casing and a locking ring, respectively, already shown in FIG. 2.
Figure 5:
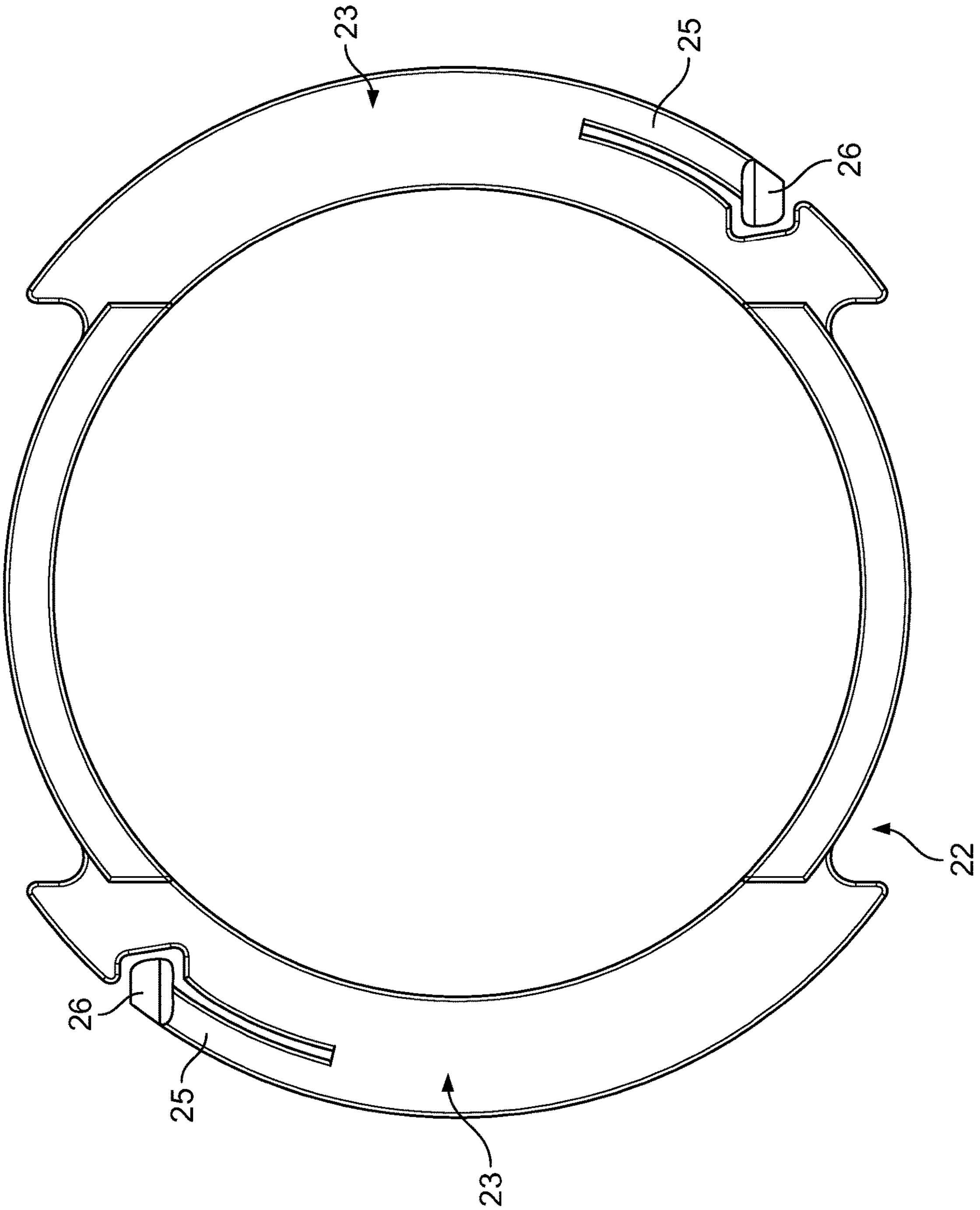

According to a further preferred feature illustrated in FIGS. 3, 8, the cover 14 comprises a corresponding element 17 protruding from the inner surface of the upper end plate (protruding toward the screw head in the final assembled configuration). The protruding element 17 is arranged to contact the screw head 15 when the screw 8 is not properly secured with its counterpart 3, thereby giving a warning to the assembly operator.

According to a further feature, the connector assembly 1 comprises an integrated sealing system to prevent water infiltration within the connector element 2 or the counterpart 3.

In one or more embodiments, the sealing system comprises a first sealing element 18 configured as an annular gasket, positioned within a receiving seat formed along the lower portion of the outer collar 4'. The receiving seat is sized to accommodate the first sealing element 18 and to make a lock with a cup portion 3' of the counterpart 3, so that the annular gasket is interposed between the counterpart 3 and the lower portion of the casing 4 of the connector element 2.

In one or more embodiments, the sealing system comprises a second sealing element 19 configured in the form of an annular gasket engaged on an end portion of the electrical connection unit 5. More in particular, the second sealing element 19 is arranged between the connection end 10 connected with the connection screw 8 and the mating flange 12, so that in the final assembled configuration, the annular gasket is engaged within the receiving portion 6 of the protective casing 4 of the connector element 2.

In one or more embodiments, the sealing system comprises a third sealing element 20 configured as an annular gasket fixed within a coupling portion 14' of the cover 14 engaged with the top edge of the outer collar 4'. When observing FIG. 9, it is thus to be noted that the coupling portion 14' is formed by an outer side wall of the cover 14 and an inner side wall along which the annular gasket is externally mounted.

According to a further feature, the connector assembly 1 comprises a locking ring 22 of the screw, fixed within the protective casing 4 of the connector element 2 and cooperating with at least one locking element formed within the outer collar 4', for the purpose of keeping the screw 8 in place even when not attached to the counterpart 3. The fixing screw 8 comprises an electrically insulated top cap 8' that is put on the head 15 of the screw. The locking ring 22 is sized to be radially mounted on a base portion 8" of the top cap 8'. According to a preferred embodiment illustrated in FIGS. 4-7, the locking ring 22 comprises two locking flanges 23 cooperating with respective locking shoulders 24 formed along the inner surface of the cylindrical wall of the outer collar 4'.

During assembly, after inserting the locking screw 8 within the outer collar 4', the hole 11 of the connection end 10 and the contact ring 21, the locking ring 22 is put around the cap 8' of the screw, with its flanges 23 oriented in an offset position with respect to the shoulders 24 (FIG. 6), so that the ring 21 can be axially inserted along the collar 4', thus overcoming the volume of the locking shoulders 24. Once the locking ring 22 is positioned against the base edge of the cap 8' put on the screw head, the ring 22 can be rotated so that the flanges 23 are vertically aligned with the shoulders 24 (FIG. 7). In a practical illustrative embodiment, the rotation of the locking ring 22 is performed at an angle of 90°. In one or more embodiments, the rotation of the locking ring 22 is performed by using an assembly tool having an operating head conformed to cooperate with the ring 22 and the outer collar 4' with the shoulders 24.

Figure 6:
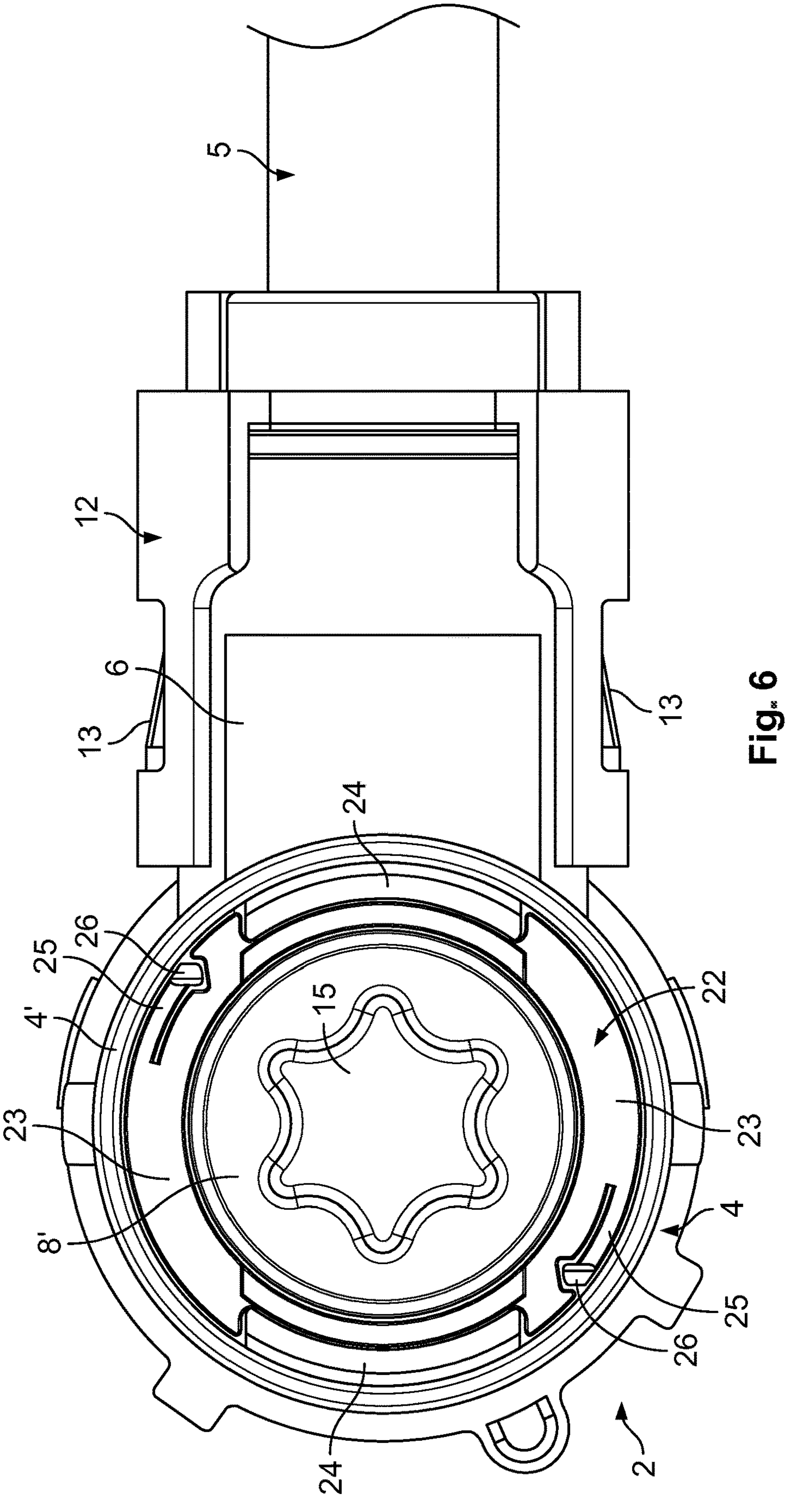
FIGS. 6, 7 are elevation views illustrating some steps of the method for assembling the connector assembly.
Figure 7:
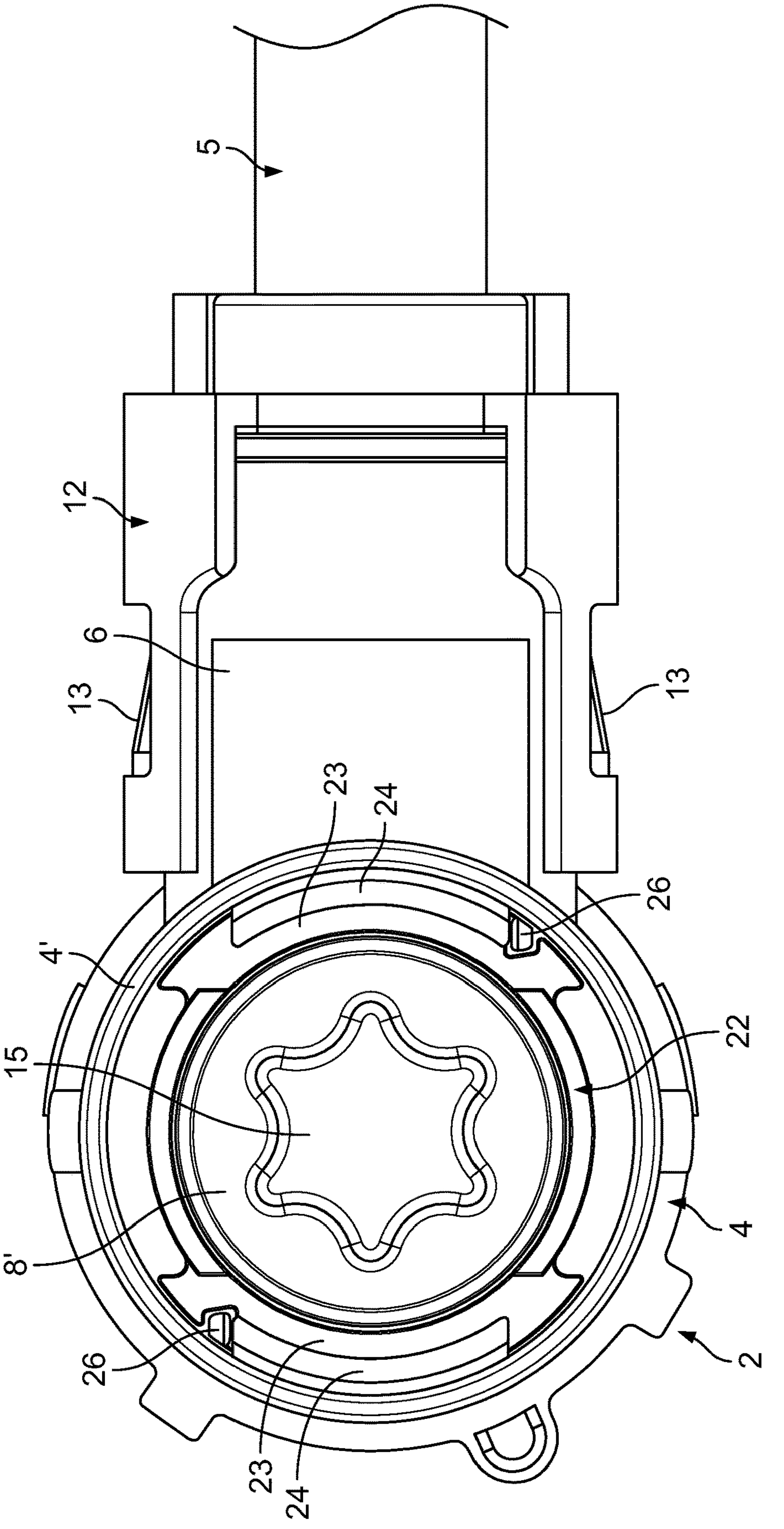

According to a further preferred feature illustrated in FIGS. 6, 7, each flange 23 carries a respective flexible locking tab 25 bearing a contact tooth 26 suitable for being mutually engaged against a lateral edge of a locking shoulder 24. During rotation of the locking ring 22, the flexible tabs 25 with teeth 26 rotate integrally with the ring 22, by passing under a respective shoulder 24, until, in the final configuration, the end of each tab 25 is raised thus realizing the contact between the tooth 26 and the lateral edge of a shoulder 24.

In accordance with the structure previously described, the subject matter herein is also directed to a method for assembling the connector assembly 1 having the features described above, comprising: inserting the contact ring 21 within the connector element 2 and making it rest against the corresponding surface 21'; placing an end portion of the electrical connection unit 5 within the receiving portion 6 of the connector element 2; inserting the connecting screw 8 within the outer collar 4', by engaging the contact ring 21 and the fastening hole 11 of the end portion of the electrical connection unit 5; assembling the locking ring 22 by axially inserting it along the cap 8' of the screw and by subsequently rotating it; connecting the connector element 2 with the counterpart 3.

Figure 9:
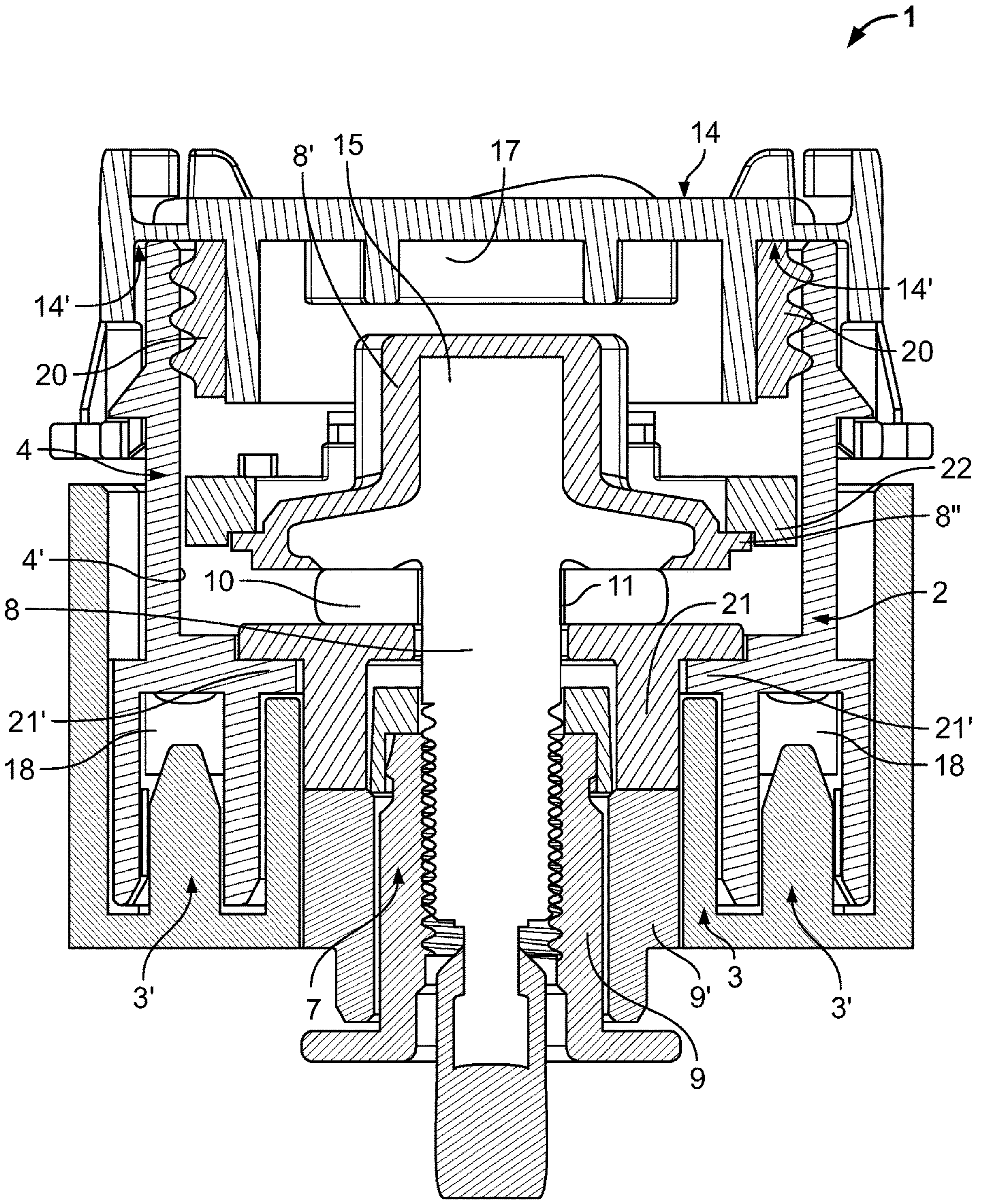
FIG. 9 is a further cross-sectional view of the connector assembly in the final assembled configuration.

As can be seen in the final assembled configuration shown in FIGS. 8, 9, the head of the screw is in contact with the connection end 10 of the connection unit 5, which is in turn in contact with the contact ring 21.

Of course, subject to the principles of this invention, the details of construction and embodiments may vary widely from what is described and illustrated as examples only, without departing from the scope of protection of the present invention.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A connector assembly for battery modules of an electric vehicle, comprising:

a connector element and a counterpart arranged to be mutually connected in an electrically conductive manner, along a connection direction, the connector element comprising a protective casing having an outer collar, electrically insulated and configured for coupling with a receiving portion of the counterpart;

an electrical connection unit having opposite ends suitable for electrically connecting two connector assemblies positioned on respective battery modules, wherein for each end, the electrical connection unit comprises a connection end connected to the connector element, wherein the protective casing is made as a single body comprising said outer collar and a receiving portion for engagement with one end of the electrical connection unit;

a fastening unit including a connection screw axially placed within the outer collar and engaged with the counterpart, wherein the connection screw is further engaged with said connection end, so as to electrically connect the connector element, the counterpart and the electrical connection unit;

a sealing system to prevent water infiltration into the connector element or the counterpart; and a locking ring to lock in place the connection screw inserted inside the outer collar even when not fixed to the counterpart, wherein said locking ring comprises at least one locking flange cooperating with a locking shoulder formed along an inner surface of the outer collar.

2. The connector assembly according to claim 1, wherein the sealing system comprises a first sealing element configured as an annular gasket positioned within a receiving seat formed along a lower portion of the outer collar engaged with a cup portion of the counterpart.

3. The connector assembly according to claim 1, wherein the sealing system comprises a second sealing element configured as an annular gasket radially superimposed over an end portion of the electrical connection unit, said second sealing element being positioned within the receiving portion of the protective casing, in a final assembled configuration.

4. The connector assembly according to claim 1, wherein the receiving portion forms further the outer collar oriented substantially along a direction perpendicular to the connection direction for connecting the connector element and the counterpart.

5. The connector assembly according to claim 1, wherein the connector assembly comprises an electrically insulated top cover coupled with an open top end of the protective casing, above a head portion of the connection screw.

6. The connector assembly according to claim 5, wherein the sealing system comprises a third sealing element configured as an annular gasket fixed within a coupling portion of the cover engaged with an upper edge of the outer collar.

7. The connector assembly according to claim 5, wherein the electrically insulated top cover comprises a protruding element projecting from the inner surface of the upper closure plane, arranged to contact the head portion when the screw is not correctly fixed to the counterpart.

8. The connector assembly according to claim 1, wherein the connection screw comprises an electrically insulated top cap, the locking ring being sized to mate with a base portion of the electrically insulated top cap.

9. The connector assembly according to claim 8, wherein the locking ring comprises a pair of locking flanges cooperating with a pair of locking shoulders, respectively, wherein, during assembly, the locking ring being axially inserted onto the electrically insulated top cap with the pair of locking flanges oriented in an offset position with respect to the pair of locking shoulders, to enable axial insertion of the ring along the collar, up to the base portion, the locking ring being rotated about the axis of the connection screw, so that the pair of locking shoulders result vertically superimposed over the flanges.

10. The connector assembly according to claim 9, wherein each locking flange comprises a respective flexible locking tab carrying a contact tooth configured for being reciprocally engaged against a lateral edge of a locking shoulder.

11. A method for assembling a connector assembly including a connector element and a counterpart arranged to be mutually connected in an electrically conductive manner, along a connection direction, the connector element comprising a protective casing having an outer collar, electrically insulated and configured for coupling with a receiving portion of the counterpart, the connector assembly including an electrical connection unit having opposite ends suitable for electrically connecting two connector assemblies positioned on respective battery modules, wherein for each end, the electrical connection unit comprises a connection end connected to the connector element, wherein the protective casing is made as a single body comprising said outer collar and a receiving portion for engagement with one end of the electrical connection unit, the connector assembly including a fastening unit including a connection screw axially placed within the outer collar and engaged with the counterpart, wherein the connection screw is further engaged with said connection end, so as to electrically connect the connector element, the counterpart and the electrical connection unit, the connector assembly including a sealing system to prevent water infiltration into the connector element or the counterpart, and the connector assembly including a locking ring to lock in place the connection screw inserted inside the outer collar even when not fixed to the counterpart, wherein said locking ring comprises at least one locking flange cooperating with a locking shoulder formed along an inner surface of the outer collar, the method comprising:

inserting the one end of the electrical connection unit into the receiving portion of the connector element, inserting the connection screw into the outer collar and engaging a fastening hole of the connection end, assembling the locking ring by axial insertion along an electrically insulated top cap of the connection screw and subsequent rotation, connecting the connector element with the counterpart.

12. The method according to claim 11, wherein the sealing system includes a first sealing element configured as an annular gasket, the method comprising positioning the annular gasket within a receiving seat formed along a lower portion of the outer collar engaged with a cup portion of the counterpart.

13. The method according to claim 12, wherein the sealing system includes a second sealing element configured as an annular gasket, the method comprising radially superimposing the annular gasket of the second sealing element over the end portion of the electrical connection unit, said second sealing element being positioned within the receiving portion of the protective casing, in the final assembled configuration.

14. The method according to claim 11, wherein the receiving portion forms further the outer collar, the method includes orienting the outer collar substantially along a direction perpendicular to the connection direction for connecting the connector element and the counterpart.

15. The method according to claim 11, wherein the connector assembly includes an electrically insulated top cover, the method includes coupling the electrically insulated top cover with an open top end of the protective casing, above a head portion of the connection screw.

16. The method according to claim 15, wherein the sealing system includes a third sealing element configured as an annular gasket, the method includes fixing the annular gasket of the third sealing element within a coupling portion of the electrically insulated top cover engaged with an upper edge of the outer collar.

17. The method according to claim 15, wherein the electrically insulated top cover includes a protruding element projecting from the inner surface of an upper closure plane, the method includes arranging the protruding element to contact the head portion when the connection screw is not correctly fixed to the counterpart.

18. The method according to claim 11, wherein the connection screw includes an electrically insulated top cap, the locking ring being sized to mate with a base portion of the electrically insulated top cap, the locking ring including a pair of locking flanges cooperating with a pair of locking shoulders, respectively, wherein the method includes axially inserting the locking ring onto the electrically insulated top cap, with the pair of locking flanges oriented in an offset position with respect to the pair of locking shoulders, to enable axial insertion of the ring along the collar, up to the base portion, the locking ring being rotated about the axis of the screw, so that the pair of locking shoulders result vertically superimposed over the flanges.

19. The method according to claim 18, wherein each of the locking flange includes a respective flexible locking tab carrying a contact tooth, the method includes reciprocally engaging the contact tooth against a lateral edge of a locking shoulder.

* * * * *